United States Patent
Aliakseyeu (10) Patent No.: US 12,550,242 B2
(45) Date of Patent: Feb. 10, 2026

(54) EXTRACTING A COLOR PALETTE FROM MUSIC VIDEO FOR GENERATING LIGHT EFFECTS

(71) Applicant: SIGNIFY HOLDING B.V., Eindhoven (NL)

(72) Inventor: Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/726,565

(22) PCT Filed: Dec. 16, 2022

(86) PCT No.: PCT/EP2022/086303
§ 371 (c)(1),
(2) Date: Jul. 3, 2024

(87) PCT Pub. No.: WO2023/131498
PCT Pub. Date: Jul. 13, 2023

(65) Prior Publication Data
US 2025/0081310 A1    Mar. 6, 2025

(30) Foreign Application Priority Data
Jan. 4, 2022    (EP) ..................................... 22150123

(51) Int. Cl.
*H05B 47/105*    (2020.01)
*G06T 7/246*    (2017.01)
(Continued)

(52) U.S. Cl.
CPC ........... *H05B 47/105* (2020.01); *G06T 7/248* (2017.01); *G06T 7/90* (2017.01); *G06V 10/56* (2022.01);
(Continued)

(58) Field of Classification Search
CPC ......... H05B 47/105; G06T 7/90; G06T 7/248; G06T 2207/10016; G06T 2207/10024; G06V 10/56; G06V 20/46
See application file for complete search history.

(56) References Cited

U.S. PATENT DOCUMENTS 10,609,794 B2 *  3/2020  Aliakseyeu ........... G06F 16/683
11,071,182 B2    7/2021  Cremer et al.
(Continued)

FOREIGN PATENT DOCUMENTS

JP    2012159810 A  *  8/2012
WO   2020089150 A1     5/2020
(Continued)

*Primary Examiner* — Adam D Houston (57) ABSTRACT

A system for controlling a lighting device to render light effects while an audio rendering device plays a song is configured to obtain an identifier of the song, obtain a music video of the song based on the identifier of the song, determine segments (51-55) in the song and in the music video, extract a color palette (61-65) from the music video for each of the segments, determine the light effects for each respective segment of the segments by selecting colors from the color palette extracted for the respective segment, and control the lighting device to render the lights effects determined for the segments while the audio rendering device plays the corresponding segments of the song.

14 Claims, 6 Drawing Sheets

(51) Int. Cl.
  *G06T 7/90*    (2017.01)
  *G06V 10/56*   (2022.01)
  *G06V 20/40*   (2022.01)

(52) U.S. Cl.
  CPC .... *G06V 20/46* (2022.01); *G06T 2207/10016* (2013.01); *G06T 2207/10024* (2013.01)

(56) References Cited

U.S. PATENT DOCUMENTS

| | | | |
|---|---|---|---|
| 12,062,220 B2* | 8/2024 | Rycroft | H05B 47/155 |
| 12,349,257 B2* | 7/2025 | Aliakseyeu | H05B 45/20 |
| 2011/0276333 A1 | 11/2011 | Wang et al. | |
| 2012/0117042 A1 | 5/2012 | Durante et al. | |
| 2018/0300582 A1 | 10/2018 | Keene et al. | |
| 2019/0104593 A1* | 4/2019 | Aliakseyeu | G06F 16/7834 |
| 2019/0124745 A1 | 4/2019 | Mason et al. | |
| 2022/0039239 A1* | 2/2022 | Rycroft | H05B 47/155 |
| 2022/0053618 A1* | 2/2022 | Borra | H05B 47/12 |
| 2023/0092759 A1* | 3/2023 | Worm | H05B 47/19 |
| | | | 315/129 |
| 2023/0380041 A1* | 11/2023 | Borra | G06F 3/165 |
| 2024/0397596 A1* | 11/2024 | Borra | H05B 47/1965 |
| 2024/0431005 A1* | 12/2024 | Aliakseyeu | H05B 47/12 |
| 2025/0081310 A1* | 3/2025 | Aliakseyeu | G06V 20/46 |
| 2025/0106966 A1* | 3/2025 | Ostojic | H05B 47/12 |
| 2025/0168953 A1* | 5/2025 | Meerbeek | H05B 47/16 |
| 2025/0193988 A1* | 6/2025 | Aliakseyeu | H05B 47/1965 |

FOREIGN PATENT DOCUMENTS

| | | | | |
|---|---|---|---|---|
| WO | WO-2020165331 A1 * | 8/2020 | ....... | H04N 21/44008 |
| WO | WO-2023131498 A1 * | 7/2023 | ............. | G06V 20/46 |

* cited by examiner

EXTRACTING A COLOR PALETTE FROM MUSIC VIDEO FOR GENERATING LIGHT EFFECTS

CROSS-REFERENCE TO PRIOR APPLICATIONS

This application is the U.S. National Phase application under 35 U.S.C. § 371 of International Application No. PCT/EP2022/086303, filed on Dec. 16, 2022, which claims the benefit of European Patent Application No. 22150123.2, filed on Jan. 4, 2022. These applications are hereby incorporated by reference herein.

FIELD OF THE INVENTION

The invention relates to a system for controlling a lighting device to render light effects while an audio rendering device plays a song.

The invention further relates to a method of controlling a lighting device to render light effects while an audio rendering device plays a song.

The invention also relates to a computer program product enabling a computer system to perform such a method.

BACKGROUND OF THE INVENTION

To create a more immersive experience for a user who is listening to a song being played by an audio rendering device, a lighting device can be controlled to render light effects while the audio rendering device plays the song. In this way, the user can create an experience at home which somewhat resembles the experience of a club or concert, at least in terms of lighting. To create an immersive light experience, the accompanying light effects should match the music in terms of e.g. color, intensity, and/or dynamics. The light effects may be synchronized to the bars and/or beats of the music or even to the rhythm of the music, for example.

While matching the light intensity of the light effects with the audio intensity of a song can be done in a straightforward manner with good results, matching the color of the light effects to the song is more challenging. When light effects are created for accompanying on-screen content, the colors for light effects are usually taken directly from the content that is played on the screen, as described in WO 2020/089150 A1, for example. When light effects are created for accompanying songs, selection of colors is not that obvious. Colors may be randomly selected from a user-defined color palette, but this impacts the user experience negatively.

SUMMARY OF THE INVENTION

It is a first object of the invention to provide a system, which controls a lighting device to render light effects related to a song with appropriate colors while an audio rendering device plays the song.

It is a second object of the invention to provide a method, which can be used to control a lighting device to render light effects related to a song with appropriate colors while an audio rendering device plays the song.

In a first aspect of the invention, a system for controlling a lighting device to render light effects while an audio rendering device plays a song comprises at least one receiver, at least one transmitter, and at least one processor configured to obtain an identifier of said song, obtain, via said at least one receiver, a music video of said song based on said identifier of said song, determine audio segments in said song and corresponding video segments in said music video, such that said audio and video segments reflect a same audio in said song and said music video, extract a color palette from said music video for each of said segments, determine said light effects for each respective segment of said segments by selecting colors from said color palette extracted for said respective segment, and control, via said at least one transmitter, said lighting device to render said lights effects determined for said segments while said audio rendering device plays said corresponding segments of said song.

By extracting a color palette per segment from a music video corresponding to a selected song and selecting colors for the accompanying light effects from these segment-dependent color palettes, appropriate colors may be selected to create a better user experience. The user experience is improved by using a dynamic color palette, i.e. a color palette which does not stay the same throughout the song. Although it would be possible to let the user choose from a set of color palettes or define an own color palette or the let the system choose colors based on album art, this static color palette would reduce the user experience. Letting the system automatically choose colors based on the energy and valence of the song would result in colors that are difficult for a user to relate to the song.

However, by extracting a color palette per segment, the color palette does not become too dynamic. It would also be possible to identify if a song has a music video and determine colors based on the music video by following the video frame by frame, but this might create too dynamic and overwhelming effects. An advantage of extracting a color palette per segment is that the light effects will have more diversity in colors that match the corresponding music video, but the resulting light effects will not be as overwhelming as they would be in case of extracting colors from each frame of the video. The set of extracted color palettes may be added to the metadata and later re-used. Furthermore, this approach also makes it possible to determine the light intensity of the light effects based on something other than how quickly colors are changing in the video from which the color palette is extracted, which in most cases would be too dynamic.

The song may be segmented in song segments and the music video may be segmented in music video segments. Determining the segments in the song and in the music video may comprise determining corresponding segments in the song and in the music video. The song segments may be determined first, the music video segments may be determined first, or the song segments and the music video segments may be compared and analyzed together. Said at least one processor may be configured to select said colors for said respective segment from said color palette determined for said respective segment. For example, said processor may be configured to select a first/last color from said color palette, randomly select a color from said color palette, select a brightest color from said palette, etc.

Said at least one processor may be configured to obtain audio characteristics of said song, and determine light intensities for said light effects based on said audio characteristics. The audio characteristics may be data points included in metadata received from a music streaming service, for example. Alternatively, the audio characteristics may be calculated by the at least one processor based on the audio data/stream of the song, for example.

Said identifier may comprise an International Standard Recording Code (ISRC) and/or a name of said song, for example. Most of the songs and their respective official video clips (if they exist) have different (but linked) unique (ISRC) codes, but alternatively, the name of the song may be used to find one or more corresponding music video clips.

Said at least one processor may be configured to obtain first audio characteristics of said song, obtain second audio characteristics of said music video, determine, based on said first audio characteristics and said second audio characteristics, a first point in said song and a second point in said music video which reflect a same moment (same audio) in one of said segments, determine a starting point of said segment in said song and a starting point of said segment in said music video based on said first and second points, and extract said color palette for said segment based on said starting points. This is beneficial, for example, if the music video clip comprises a slightly different version of the song compared to the version that is available on music streaming services. For example, a video version could have a longer intro.

Said at least one processor may be configured to determine said segments based on metadata associated with said song. One or more of said segments may correspond to a verse or a chorus, for example. Alternatively or additionally, said at least one processor may be configured to analyze said music video to identify cuts in said music video and determine said segments based on said identified cuts. The segments may be determined, for example, based on only both song metadata/analysis and music video metadata/analysis. Cuts may be detected based on the color palette changing beyond a threshold from one (set of) image(s) in the music video to the next.

Said at least one processor may be configured to associate said extracted color palette with said identifier of said song and store said extracted color palette and said association in a memory. This may be done to avoid having to extract the color palette again for the same song and thereby save time and resources.

Said at least one processor may be configured to extract said color palettes by determining contrasting colors and/or saturated colors from said music video for each of said segments. Contrasting colors and/or saturated colors often provide the best user experience.

Said at least one processor may be configured to select a segment from said segments and extract said color palette from said selected segment by determining colors per video frame of said selected segment, combining said colors, and selecting a subset of said aggregation of said colors. This enables a relatively simple implementation.

Said at least one processor may be configured to algorithmically generate additional colors if colors determined from the selected segment of the music video are limited in number and/or variety. For example, colors that are in between the ones that are determined from the music video may be added (e.g., add purple if blue and red present), complimentary colors may be added, and/or shades of determined colors may be added.

Said at least one processor may be configured to select a segment from said segments and extract said color palette from said selected segment by determining color changes between same spatial areas of different video frames of said segments, selecting a subset of said spatial areas above a (predetermined) color change threshold, determining for each respective color of a plurality of colors for said subset of said spatial areas, a quantity of pixels with said respective color and selecting colors used in said subset of spatial areas based on said quantities of pixels. This may require a more advanced implementation but adds time as an additional dimension.

Said at least one processor may be configured to select a segment from said segments and extract said color palette from said selected segment by determining for each respective color of a plurality of colors, per one or more video frames of said selected segment, a quantity of pixels with said respective color and selecting colors from said plurality of colors based on said quantities of pixels. The quantities of pixels may be stored in a color histogram, for example.

Said at least one processor may be configured to identify at least a first segment and a second segment of a same type (e.g., identify a first segment and a second segment that have a content similarity which is above a threshold) from said determined segments and extract said color palette for said first segment and said color palette for said second segment by extracting a color palette from an added segment which comprises both said first segment and said second segment. This is beneficial, for example, if it is detected that a color palette of a certain segment is not very "interesting" (e.g., colors are not saturated or contrasting).

Alternatively, said at least one processor may be configured to identify at least a first segment and a second segment of a same type from said determined segments and extract said color palette for said first segment and said color palette for said second segment from either said first segment or said second segment.

In a second aspect of the invention, a method of controlling a lighting device to render light effects while an audio rendering device plays a song comprises obtaining an identifier of said song, obtaining a music video of said song based on said identifier of said song, determining segments in said song and in said music video, extracting a color palette from said music video for each of said segments, determining said light effects for each respective segment of said segments by selecting colors from said color palette extracted for said respective segment, and controlling said lighting device to render said lights effects determined for said segments while said audio rendering device plays said corresponding segments of said song. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for determining a suitability of an input modality for controlling a lighting device to render light effects while an audio rendering device plays a song.

The executable operations comprise obtaining an identifier of said song, obtaining a music video of said song based on said identifier of said song, determining segments in said song and in said music video, extracting a color palette from said music video for each of said segments, determining said light effects for each respective segment of said segments by selecting colors from said color palette extracted for said respective segment, and controlling said lighting device to render said lights effects determined for said segments while said audio rendering device plays said corresponding segments of said song.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java (TM), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
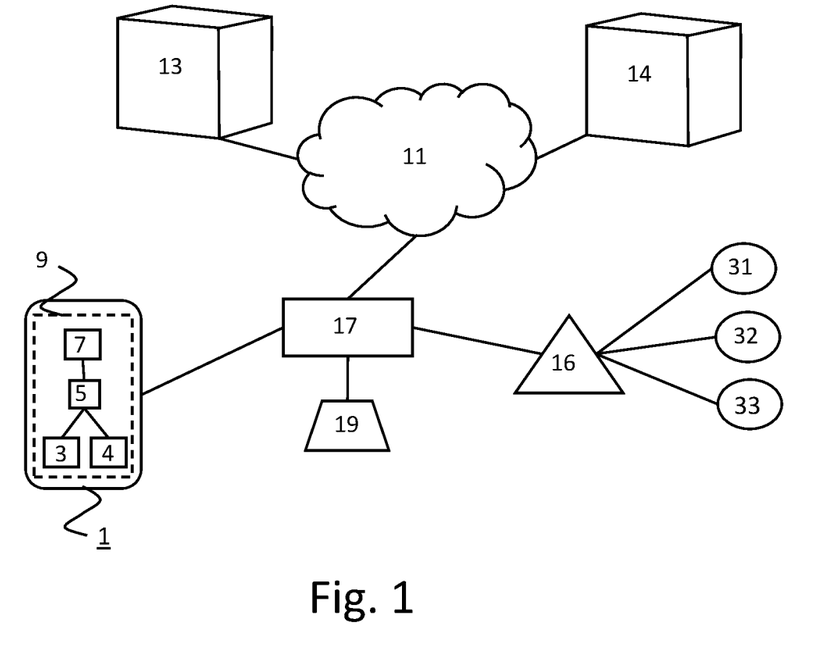
FIG. 1 is a block diagram of a first embodiment of the system.

FIG. 1 shows a first embodiment of the system for controlling a lighting device to render light effects while an audio rendering device plays a song. In this first embodiment, the system is a mobile device 1. A lighting system comprises a bridge 16 and lighting devices 31-33. Lighting devices 31-33 can be controlled via bridge 16, e.g. using Zigbee technology. Lighting devices 31-33 may be Philips Hue lamps, for example. The bridge 16 may be a Philips Hue bridge, for example.

The bridge 16 is connected to a wireless LAN access point 17, e.g. via Wi-Fi or Ethernet. The wireless LAN access point 17 is connected to the Internet 11. Mobile device 1 is able to control lighting devices 31-33 via the wireless LAN access point 17 and the bridge 16. Internet server 13 is a server of an audio streaming service, e.g. Spotify. Internet server 14 is a server that stores music video clips, e.g. YouTube. The Internet servers 13 and 14 are also connected to the Internet 11. Instead of a single Internet server, a cluster of Internet servers may be used. This cluster may be part of one or more clouds.

The mobile device 1 comprises a receiver 3, a transmitter 4, a processor 5, memory 7, and a display 9. The processor 5 is configured to obtain, via the receiver 3, an identifier of the song from the Internet server 13, obtain, via the receiver 3, a music video of the song from the Internet server 14 based on the identifier of the song, determine segments in the song and in the music video, extract a color palette from the music video for each of the segments, determine the light effects for each respective segment of the segments by selecting colors from the color palette extracted for the respective segment, and control, via the transmitter 4, one or more of the lighting devices 31-33 to render the lights effects determined for the segments while the audio rendering device plays the corresponding segments of the song.

For instance, a user may be able to select a song for playback using mobile device 1, which will then be accompanied by light effects on one or more of the lighting devices 31-33. The song may be output on speakers of the mobile device 1 (not shown), on headphones/earphones connected to the mobile device 1 (now shown), or on a smart speaker system 19, for example.

The light effects may be determined based on the metadata provided by Spotify, consisting of highly detailed audio descriptors. Based on this metadata, and the setup of the user, a light script can be created and then streamed to the lighting device(s). The generated light effects are 'in sync' with the song being played. 'In sync' means that the accompanying light effects match the music in terms of e.g. intensity and/or dynamics, and may involve a temporal sync where key elements in the music are rendered on the lighting devices with a non-noticeable temporal difference.

In the embodiment of FIG. 1, the mobile device 1 receives data points from the Internet server 13 and the processor 5 is configured to select a subset of the data points of which the audio intensity (normally expressed in dB) exceeds an audio intensity threshold. This audio intensity threshold may be dynamic. The processor 5 is further configured to determine the light effects based on the selected data points. In the embodiment of FIG. 1, the light intensity, and only the light intensity, depends on the audio intensity specified in the metadata. In an alternative embodiment, the light intensity is determined in a different manner. For example, the light intensity may be the same for all light effects, e.g. may be equal to a user-specified value. The audio intensity may be used for different purposes than determining the light intensity. For example, the number of lights on which to render the light effects may be determined based on the audio intensity, the type of light effect may be determined based on the audio intensity, or the location of the light effects may be determined based on the audio intensity (e.g., rendering closer to the user or further away).

The colors of the light effects are selected (e.g. randomly) from the color palettes extracted from the music video. Light effects for data points in a certain segment of the song (and in the corresponding music video) have a color that is selected from a color palette extracted from this certain segment in the music video. The processor 5 may be configured to determine the segments based on metadata associated with the song and/or to analyze the music video to identify cuts in the music video and determine the segments based on the identified cuts. With regard the former case, an example of an audio streaming service providing such metadata is Spotify. The segments may be determined based on the section information provided by Spotify. Spotify indicates the start and duration of each section of the song. A section may be a verse or chorus, for example. Sections are not labelled and may have different durations.

If the video clip version is close or identical to the version of the song that the user is listening to on a music streaming service, then music metadata may be used to split the video clip into segments and the color palette may then be extracted from each video clip segment in a straightforward manner. However, often, the video clip comprises a slightly different version of the song compared to the version that is available on music streaming services. For example, a video version could have a longer intro. If a significant difference in length is detected, then the color palette could be extracted only using video analysis (e.g., cuts and scene detection). Alternatively, the sound track of the music video could be analyzed and matched with the streamed version, and then music metadata could be used to define segments for palette extraction.

In the embodiment of FIG. 1, the identifier of the song is obtained from the Internet server 13. Most of the music composition and music video clips have an International Standard Recording Code (https://www.usisrc.org/). Using the music composition code, the matching video clip, if it exists, may be found (e.g., on YouTube). Alternatively, the name of the music composition may be used to search any associated videos on a video streaming service. Any tags assigned to the videos by the video streaming service (e.g., YouTube) may be used to distinguish between official, concert and user-created videos. To avoid repeating the calculations, the color palettes, once extracted, may be stored in the cloud and/or added to the song metadata.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen display, for example. The processor 5 may use display 9 to provide a user interface, for example. The memory 7 may comprise one or more memory units. The memory 7 may comprise solid state memory, for example. The memory 7 may be part of the system, e.g., mobile device 1. In another example, the system 1 may have access to the memory 7.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver.

The mobile device 1 may comprise other components typical for a mobile device such as a battery and a power connector. The invention may be implemented using a computer program running on one or more processors.

In the embodiment of FIG. 1, the lighting devices 31-33 are controlled by the mobile device 1 via the bridge 16. In an alternative embodiment, one or more of the lighting devices 31-33 are controlled by the mobile device 1 without a bridge, e.g. via the Internet server 13 and the wireless LAN access point 17 or directly via Bluetooth. The lighting devices 31-33 may be capable of receiving and transmitting Wi-Fi signals, for example.

Figure 2:
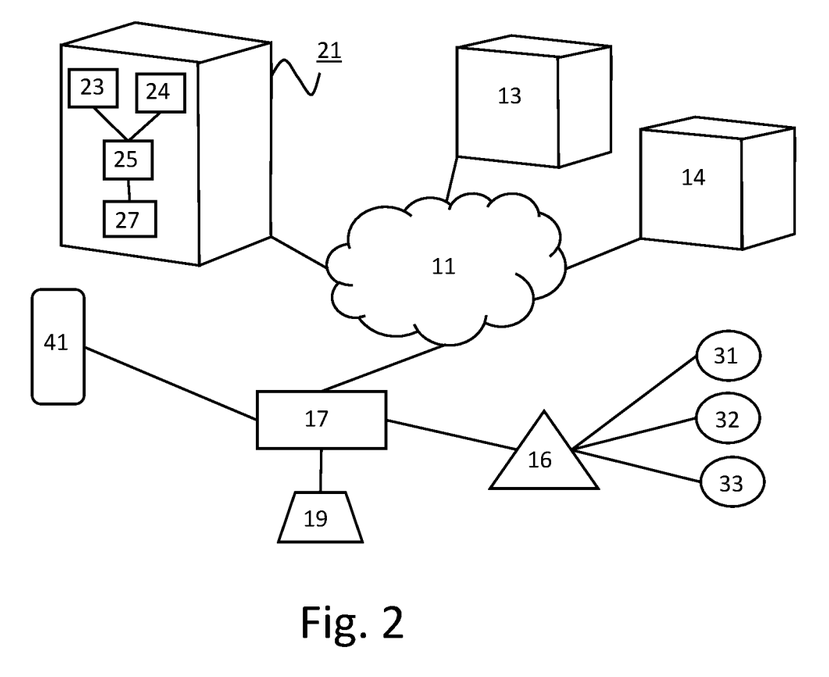
FIG. 2 is a block diagram of a second embodiment of the system.

FIG. 2 shows a second embodiment of the system for controlling a lighting device to render light effects while an audio rendering device plays a song. In this second embodiment, the system is a computer 21. The computer 21 is connected to the Internet 11 and acts as a server. The computer 21 may be operated by a lighting company, for example. In the embodiment of FIG. 2, the computer 21 is able to control the lighting devices 31-33 via the wireless LAN access point 17 and the bridge 16.

The computer 21 comprises a receiver 23, a transmitter 24, a processor 25, and storage means 27. The processor 25 is configured to obtain, via the receiver 23, an identifier of the song from the Internet server 13, obtain, via the receiver 23, a music video of the song from the Internet server 14 based on the identifier of the song, determine segments in the song and in the music video, extract a color palette from the music video for each of the segments, determine the light effects for each respective segment of the segments by selecting colors from the color palette extracted for the respective segment, and control, via the transmitter 24, one or more of the lighting device 31-33 to render the lights effects determined for the segments while the audio rendering device plays the corresponding segments of the song.

Figure 3:
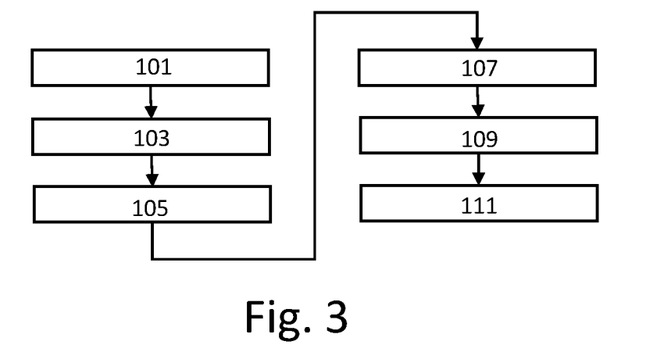
FIG. 3 is a flow diagram of a first embodiment of the method.

In the embodiment of the computer 21 shown in FIG. 3, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with the wireless LAN access point 17, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

In the embodiment of FIG. 2, the computer 21 transmits data to the lighting devices 31-33 via the bridge 16. In an alternative embodiment, the computer 21 transmits data to the lighting devices 31-33 without a bridge.

A first embodiment of the method of controlling a lighting device to render light effects while an audio rendering device plays a song is shown in FIG. 3. The method may be performed by the mobile device 1 of FIG. 1 or the cloud computer 21 of FIG. 2, for example.

A step 101 comprises obtaining an identifier of a song. A step 103 comprises obtaining a music video of the song based on the identifier of the song that was obtained in step 101. A step 105 comprises determining segments in the song and in the music video obtained in step 103. A step 107 comprises extracting a color palette from the music video obtained in step 103 for each of the segments determined in step 105.

A step 109 comprises determining the light effects for each respective segment of the segments by selecting colors from the color palette extracted for the respective segment in step 107. A step 111 comprises controlling the lighting device to render the lights effects determined for the segments, as determined in step 109, while the audio rendering device plays the corresponding segments of the song.

Figure 4:
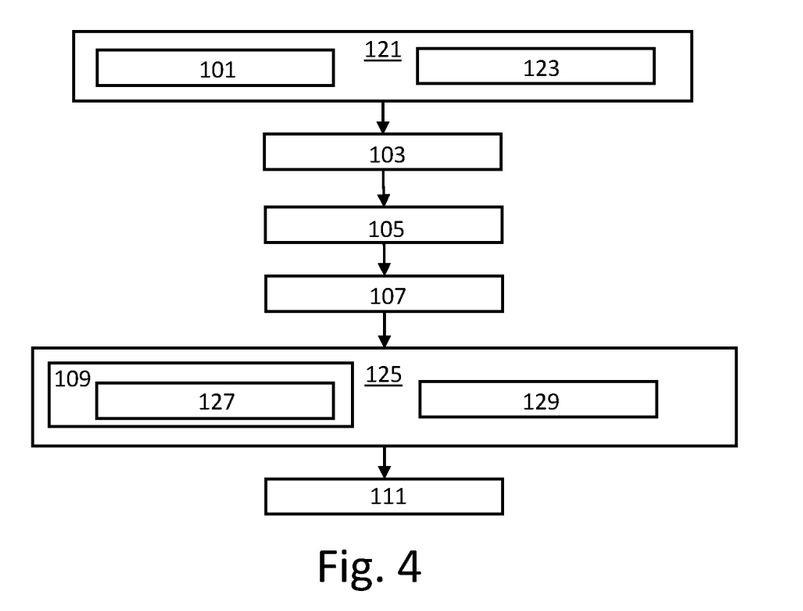
FIG. 4 is a flow diagram of a second embodiment of the method.

A second embodiment of the method of controlling a lighting device to render light effects while an audio rendering device plays a song is shown in FIG. 4. The method may be performed by the mobile device 1 of FIG. 1 or the cloud computer 21 of FIG. 2, for example.

A step 121 comprises obtaining metadata associated with a song. Step 121 comprises sub steps 101 and 123. Step 101 comprises obtaining an identifier of the song. Step 123 comprises obtaining audio characteristics of the song. The audio characteristics obtained in step 123 may be data points received from an audio streaming service or may be audio characteristics determined by analyzing the song locally.

Obtaining the metadata may comprise generating (part of the) metadata. In an alternative embodiment, steps 101 and 123 are not separate sub steps.

Step 103 comprises obtaining a music video of the song based on the song identifier obtained in step 101. Step 105 comprises determining segments in the song and in the corresponding music video obtained in step 103. Step 107 comprises extracting a color palette from the music video obtained in step 103 for each of the segments determined in step 105. Methods and techniques for color extraction (e.g., trimean color determination, mean color determination, median color determination, or mode color determination), dominant color determination, dominant illumination color determination, visible light source color determination, and/or feature color determination) are known in the field of entertainment lighting.

A step 125 comprises determining the light effects for each respective segment of the segments. Light effects may be determined in step 125 for events in the audio at which the audio intensity exceeds a threshold, e.g. only for the received data points of which the audio intensity exceeds the threshold. Step 125 comprises sub steps 109 and 129. Step 109 comprises selecting, for each respective segment, colors from the corresponding color palette extracted in step 107.

Step 109 is implemented by a step 127. Step 127 comprises randomly selecting, for each respective segment, colors from the corresponding color palette extracted in step 107. Multiple randomly selected colors may be used for light effects for the same segment. For example, a first randomly selected color may be used for a first period of a segment and a second randomly selected color may be used for a second period of the segment. In another example, step 127 comprises determining and selecting the mean color, for each respective segment, from the corresponding color palette extracted in step 107. Optionally step 127 comprises algorithmically generating additional colors if colors determined from the selected segment of the music video are limited in number and/or variety. For example, colors that are in between the ones that are determined from the music video may be added (e.g., add purple if blue and red present), complimentary colors may be added, and/or shades of determined colors may be added.

In an alternative embodiment, a color palette may be extracted from each of the different parts of the video frame (e.g., left, right, and center) and then colors may be assigned randomly from each color palette from each part of the video frame to the lighting device(s) located in the corresponding spatial location.

Step 129 comprises determining light intensities for the light effects based on the audio characteristics obtained in step 123. In an alternative embodiment, the light intensities are determined in a different manner in step 129. For example, the light intensities may all be the same, e.g. a user-specified value. Optionally, a measure of color palette change is determined and used in step 129 to adjust the determined light intensities. For example, if the color change is extremely intense, the intensity of light effects may be increased slightly above the level that would be used if only audio or user input would be relied on.

Step 111 comprises controlling the lighting device to render the lights effects determined for the segments, as determined in step 125, while the audio rendering device plays the corresponding segments of the song.

Figure 5:
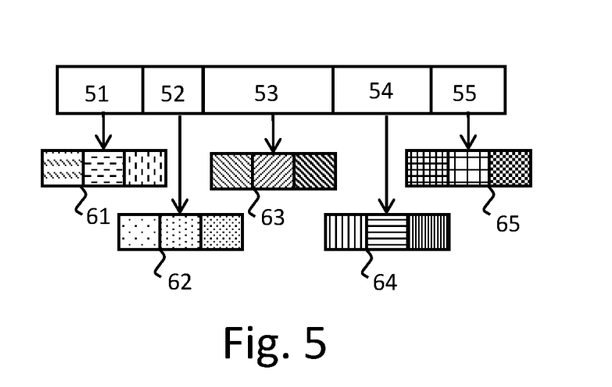
FIG. 5 shows an example of color palettes determined for music segments.

FIG. 5 shows an example of color palettes determined for music segments. Both a song and the music video of this song comprise segments 51-55. These segments are determined in step 105 of the method of FIG. 4, for example. For each of the segments, a color palette has been extracted from the music video, e.g. in step 107 of the method of FIG. 4. A color palette 61 has been extracted from segment 51, a color palette 62 has been extracted from segment 52, a color palette 63 has been extracted from segment 53, a color palette 64 has been extracted from segment 54, and a color palette 65 has been extracted from segment 55.

Figure 6:
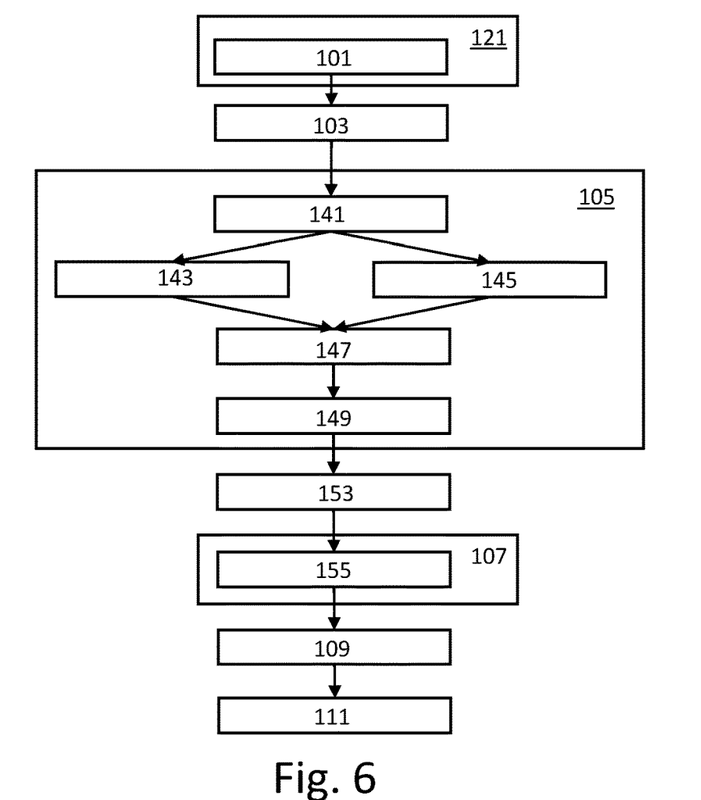
FIG. 6 is a flow diagram of a third embodiment of the method.

A third embodiment of the method of controlling a lighting device to render light effects while an audio rendering device plays a song is shown in FIG. 6. The method may be performed by the mobile device 1 of FIG. 1 or the cloud computer 21 of FIG. 2, for example.

A step 121 comprises obtaining metadata associated with a song. The metadata comprises at least an identifier of the song. Step 103 comprises obtaining a music video of the song based on the song identifier obtained in step 121. Step 105 comprises determining segments in the song and in the music video obtained in step 103. In the embodiment of FIG. 6, step 105 comprises sub steps 141, 143, 145, 147, and 149.

Step 141 comprises determining segments in the song based on metadata associated with the song obtained in step 121. One or more of the segments may correspond to a verse or a chorus, for example. Step 143 comprises obtaining first audio characteristics: audio characteristics of the song. Step 145 comprises obtaining second audio characteristics: audio characteristics of the music video.

Step 147 comprises determining, based on the first audio characteristics determined in step 143 and the second audio characteristics determined in step 145, a first point in the song and a second point in the music video which reflect a same moment in one of the segments. Such a same moment may be found using audio fingerprinting, for example. Step 147 comprises locating the segments in the music video based on the first and second points. Step 149 comprises determine a starting point of each segment in the song and a corresponding starting point of each segment in the music video.

Next, a step 153 comprises identifying which of the segments determined in step 105 have a same type, for example identify which of the segments have a content similarity which is above a threshold. Step 107 comprises extracting a color palette from the music video obtained in step 103 for each of the segments determined in step 105. In the embodiment of FIG. 6, step 107 is implemented by a step 155. Step 155 comprises extracting a color palette for each of the segments using the results of step 149. If it is determined in step 153 that a first segment and a second segment have a same type, a color palette is extracted from an aggregated segment which comprises both the first segment and the second segment. Thus, similar repeating sections (e.g. repeating chorus) may be identified and then color palette extraction may performed for each repeating part as a whole rather than individually.

Step 109 comprises determining the light effects for each respective segment of the segments by selecting colors from the color palette extracted for the respective segment in step 107. Step 111 comprises controlling the lighting device to render the lights effects determined for the segments, as determined in step 109, while the audio rendering device plays the corresponding segments of the song.

Figure 7:
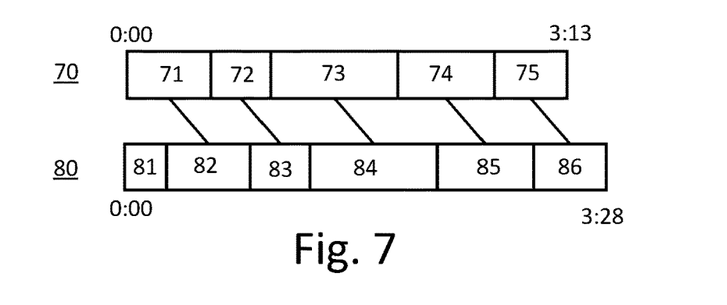
FIG. 7 shows an example of song segments and corresponding music video segments.

FIG. 7 shows an example of songs segments and corresponding music video segments. A song 70 starts at 0:00, ends at 3:13, and comprises five segments 71-75. A music video 80 starts at 0:00, ends at 3:28, and comprises six segments 81-86. The music video 80 is 15 seconds longer than the song 70, e.g. because of an additional intro. Segments 81 and 82 may be treated as different segments simply because segment 81 does not have a corresponding portion in the song 70. Song segment 71 and music video segment 82 correspond to the same segment, song segment 72 and music video segment 83 correspond to the same segment, song segment 73 and music video segment 84 correspond to the same segment, song segment 74 and music video segment 85 correspond to the same segment, and song segment 75 and music video segment 86 correspond to the same segment.

Figure 8:
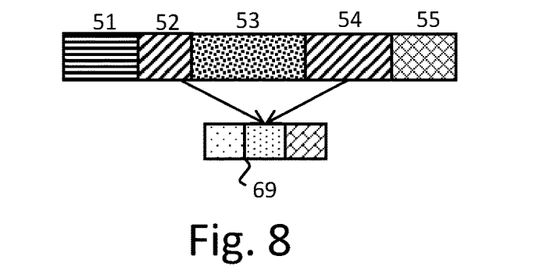
FIG. 8 shows an example in which a color palette is extracted from an aggregated segment.

FIG. 8 shows an example in which a color palette is extracted from an aggregated segment using the method of FIG. 6. Of five determined segments 51-55, segments 52 and 54 have a similar type. The same color palette 69 is used for segments 52 and 54. This color palette 69 is extracted from the aggregated segment which comprises segments 52 and 54. A color that is dominant in segment 52 or dominant in segment 54 might not be dominant in the aggregated segment.

Figure 9:
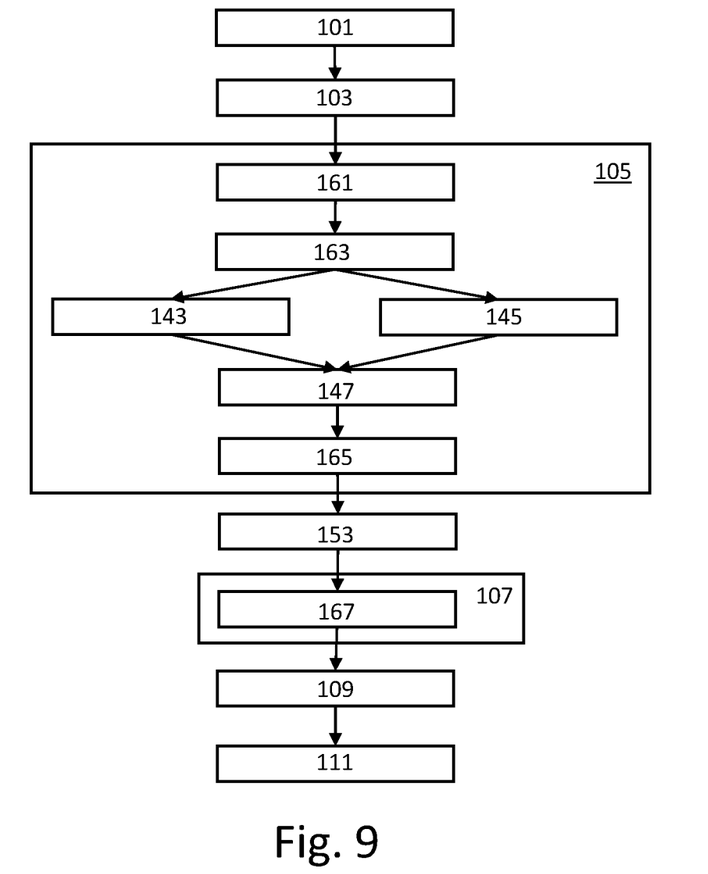
FIG. 9 is a flow diagram of a fourth embodiment of the method.

A fourth embodiment of the method of controlling a lighting device to render light effects while an audio rendering device plays a song is shown in FIG. 9. The method may be performed by the mobile device 1 of FIG. 1 or the cloud computer 21 of FIG. 2, for example.

Step 101 comprises obtaining an identifier of a song. Step 103 comprises obtaining a music video of the song based on the song identifier obtained in step 101. Step 105 comprises determining segments in the song and in the music video obtained in step 103. In the embodiment of FIG. 9, step 105 comprises sub steps 161, 163, 143, 145, 147, 149, and 165.

Step 161 comprises analyzing the music video obtained in step 103 to identify cuts in the music video. Cuts may be detected based on the color palette changing beyond a threshold from one (set of) image(s) in the music video to the next. Step 163 comprises determining segments in the music video based on the cuts identified in step 161. Step 143 comprises obtaining first audio characteristics: audio characteristics of the song. Step 145 comprises obtaining second audio characteristics: audio characteristics of the music video.

Step 147 comprises determining, based on the first audio characteristics determined in step 143 and the second audio characteristics determined in step 145, a first point in the song and a second point in the music video which reflect a same moment in one of the segments. Such a same moment may be found using audio fingerprinting, for example. Step 165 comprises locating the segments in the song based on the first and second points. Step 165 comprises determine a starting point of each segment in the music video and a corresponding starting point of each segment in the song.

Next, step 153 comprises identifying which of the segments determined in step 105 have a same type. Step 107 comprises extracting a color palette from the music video obtained in step 103 for each of the segments determined in step 105. In the embodiment of FIG. 9, step 107 is implemented by a step 167. Step 167 comprises extracting a color palette for each of the segments using the results of step 165. If it is determined in step 153 that a first segment and a second segment have a same type, a color palette is extracted for the first segment and for the second segment from either first segment or from the second segment in step 167.

For example, if it is detected that a color palette of a certain segment is not very "interesting" (e.g., colors are not saturated or contrasting), it may be checked whether there is another segment that is close in music content to this one (e.g. chorus is usually repeated a few times) and that has a better color palette and if so, this color palette may be used.

Step 109 comprises determining the light effects for each respective segment of the segments by selecting colors from the color palette extracted for the respective segment in step 107. Step 111 comprises controlling the lighting device to render the lights effects determined for the segments, as determined in step 109, while the audio rendering device plays the corresponding segments of the song.

Figure 10:
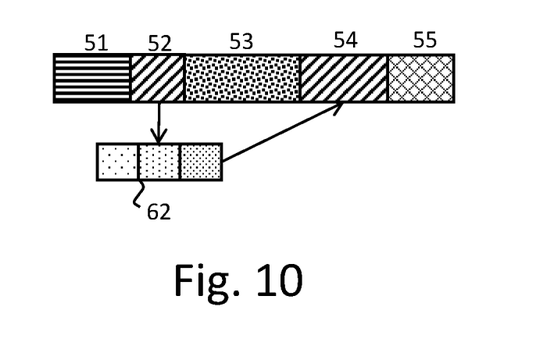
FIG. 10 shows an example in which a color palette extracted from a first segment is also used for a second segment.
Figure 12:
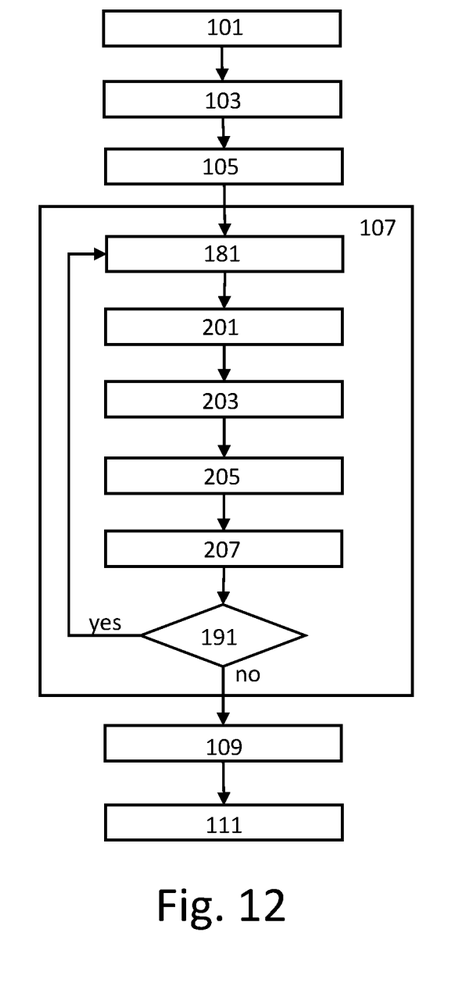
FIG. 12 is a flow diagram of a sixth embodiment of the method.

FIG. 10 shows an example in which a color palette extracted from a first segment is also used for a second segment, e.g. by the method of FIG. 9. Of five determined segments 51-55, segments 52 and 54 have a similar type. The same color palette 62 is used for segments 52 and 54. In the example of FIG. 12, it is not possible to extract an "interesting" color palette from segment 54 but since segments 52 and 54 have a similar type (e.g. chorus), the color palette 62 extracted from segment 52 is also used for segment 54.

Figure 11:
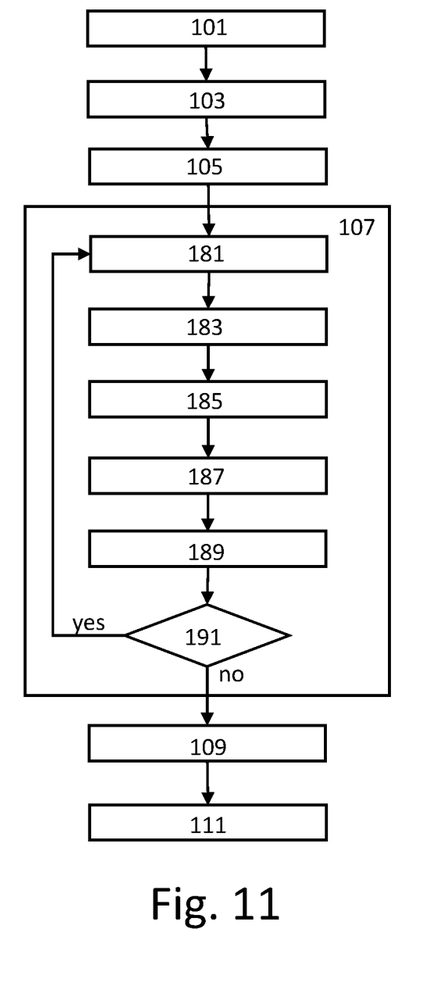
FIG. 11 is a flow diagram of a fifth embodiment of the method.

A fifth embodiment of the method of controlling a lighting device to render light effects while an audio rendering device plays a song is shown in FIG. 11. The method may be performed by the mobile device 1 of FIG. 1 or the cloud computer 21 of FIG. 2, for example.

Step 101 comprises obtaining an identifier of a song. Step 103 comprises obtaining a music video of the song based on the song identifier obtained in step 101. Step 105 comprises determining segments in the song and in the music video obtained in step 103. Step 107 comprises extracting a color palette from the music video obtained in step 103 for each of the segments determined in step 105. In the embodiment of FIG. 11, step 107 is implemented by steps 181, 183, 185, 187, 189, and 191.

Step 181 comprises selecting a segment from the segments determined in step 105. In the first iteration of step 181, a first segment is selected from these segments. Step 183 comprises determining for each respective color of a plurality of colors per video frame of the segment just selected in step 181, a quantity of pixels with the respective color. Step 185 comprises selecting colors from the plurality of colors based on the quantities of pixels determined in step 183. Step 187 comprises combining g the colors selected in step 185. For example, the combination may comprise the dominant color(s) per video frame. In another example, the combination may comprise averaging the colors determined per video frame.

Step 189 comprises selecting a subset of the colors aggregated in step 187. These selected colors are the extracted colors. Step 185 and/or step 189 may comprise determining contrasting colors (with respect to hue) and/or saturated colors from the plurality of colors and/or the aggregation of colors, respectively. Step 191 comprises checking whether colors have been extracted from all segments determined in step 105. If so, step 109 is performed. If not, a next segment is selected in the next iteration of step 181 and steps 183-191 are repeated for this next segment.

Step 109 comprises determining the light effects for each respective segment of the segments by selecting colors from the color palette extracted for the respective segment in step 107. Step 111 comprises controlling the lighting device to render the lights effects determined for the segments, as determined in step 109, while the audio rendering device plays the corresponding segments of the song.

Thus, in the embodiment of FIG. 11, colors are extracted from each video frame, after which the palette is defined as a whole, analogous to stitching all frames together and analyzing the result as one large image.

A sixth embodiment of the method of controlling a lighting device to render light effects while an audio rendering device plays a song is shown in FIG. 12. The method may be performed by the mobile device 1 of FIG. 1 or the cloud computer 21 of FIG. 2, for example.

Step 101 comprises obtaining an identifier of a song. Step 103 comprises obtaining a music video of the song based on the song identifier obtained in step 101. Step 105 comprises determining segments in the song and in the music video obtained in step 103. Step 107 comprises extracting a color palette from the music video obtained in step 103 for each of the segments determined in step 105. In the embodiment of FIG. 12, step 107 is implemented by steps 181, 201, 203, 205, 207, and 191.

Step 181 comprises selecting a segment from the segments determined in step 105. In the first iteration of step 181, a first segment is selected from these segments. Step 201 comprises determining color changes between same spatial areas of different video frames of the segment just selected in step 181. Step 203 comprises selecting a subset of the spatial areas above a color change threshold. Step 205 comprises determining for each respective color of a plurality of colors for the spatial areas selected in step 203, a quantity of pixels with the respective color. These colors may be determined per video frame or group of video frames and then aggregated as described in relation to FIG. 11 or may be determined at the same time for all video frames of the segment in the music video without having to be aggregated.

Step 207 comprises selecting colors from the plurality of colors based on the quantities of pixels determined in step 205. These selected colors are the extracted colors. Step 207 may comprise determining contrasting colors and/or saturated colors from the plurality of colors. Step 191 comprises checking whether colors have been extracted from all segments determined in step 105. If so, step 109 is performed. If not, a next segment is selected in the next iteration of step 181 and steps 201, 203, 205, 207, and 191 are repeated for this next segment.

Step 109 comprises determining the light effects for each respective segment of the segments by selecting colors from the color palette extracted for the respective segment in step 107. Step 111 comprises controlling the lighting device to render the lights effects determined for the segments, as determined in step 109, while the audio rendering device plays the corresponding segments of the song. Thus, in the embodiment of FIG. 12, time is used as an additional dimension; not only the dominant colors are selected but also the most dynamic colors.

Figure 13:
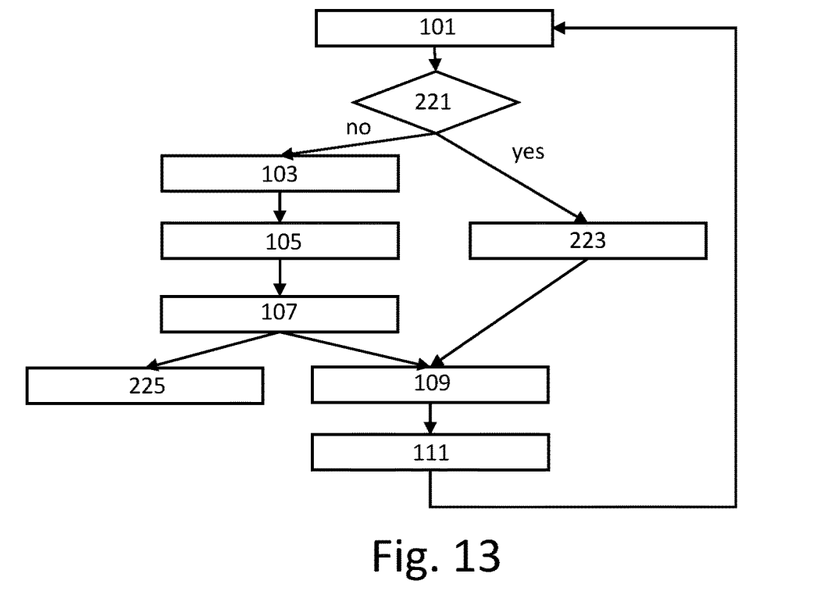
FIG. 13 is a flow diagram of a seventh embodiment of the method.

A seventh embodiment of the method of controlling a lighting device to render light effects while an audio rendering device plays a song is shown in FIG. 13. The seventh of FIG. 13 is an extension of the first embodiment of FIG. 3. A step 221 is performed after step 101. Step 221 comprises determining whether a color palette has already been associated in a memory with the song identifier obtained in step 101. If so, a step 223 is performed. Step 223 comprises obtaining the color palette associated with the song identifier from the memory.

If it is determined in step 221 that no color palette has been associated with the song identifier, steps 103, 105, and 107 are performed as described in relation to FIG. 3. Step 109 is performed after step 107 or step 223 has been performed. Step 109 comprises determining the light effects for each respective segment of the segments by selecting colors from the color palette for the respective segment, from the color palette just extracted in step 107 or the color palette obtained from memory in step 223 (which was extracted in a previous iteration of step 107). Then, step 111 comprises controlling the lighting device to render the lights effects determined for the segments, as determined in step 109, while the audio rendering device plays the corresponding segments of the song.

A step 225 is also performed after step 107. Step 225 comprises associating the color palette extracted in step 107 with the song identifier obtained in step 101 and storing the extracted color palette and the association in a memory. This color palette can later be retrieved from the memory in step 223 when the same song is played a next time, e.g. by the same user or by a different user. Step 101 is repeated after step 111, after which the method proceeds as shown in FIG. 13.

In an alternative embodiment, instead of or in addition to storing the extracted color palette, the determined light effects may be stored as a light script associated with the song identifier in a step performed after step 109. This stored light script may then be retrieved from the memory instead of the color palette when the same song is played a next time.

The embodiments of FIGS. 3, 4, 6, 9, 11, 12, and 13 differ from each other in multiple aspects, i.e. multiple steps have been added or replaced. In variations on these embodiments, only a subset of these steps is added or replaced and/or one or more steps is omitted. As a first example, step 127 may be omitted from the embodiment of FIG. 4 and/or added to one or more of the embodiments of FIGS. 3, 6, 9, 11, 12, and 13. As a second example, steps 123 and 129 of FIG. 4 may be added to one or more of the embodiments of FIGS. 3, 6, 9, 11, 12, and 13. One or more of the embodiments of FIGS. 3, 4, 6, 9, 11, 12, and 13 may be combined. For example, the embodiment of FIG. 13 may be combined with one or more of the embodiments of FIGS. 4, 6, 9, 11, and 12.

Figure 14:
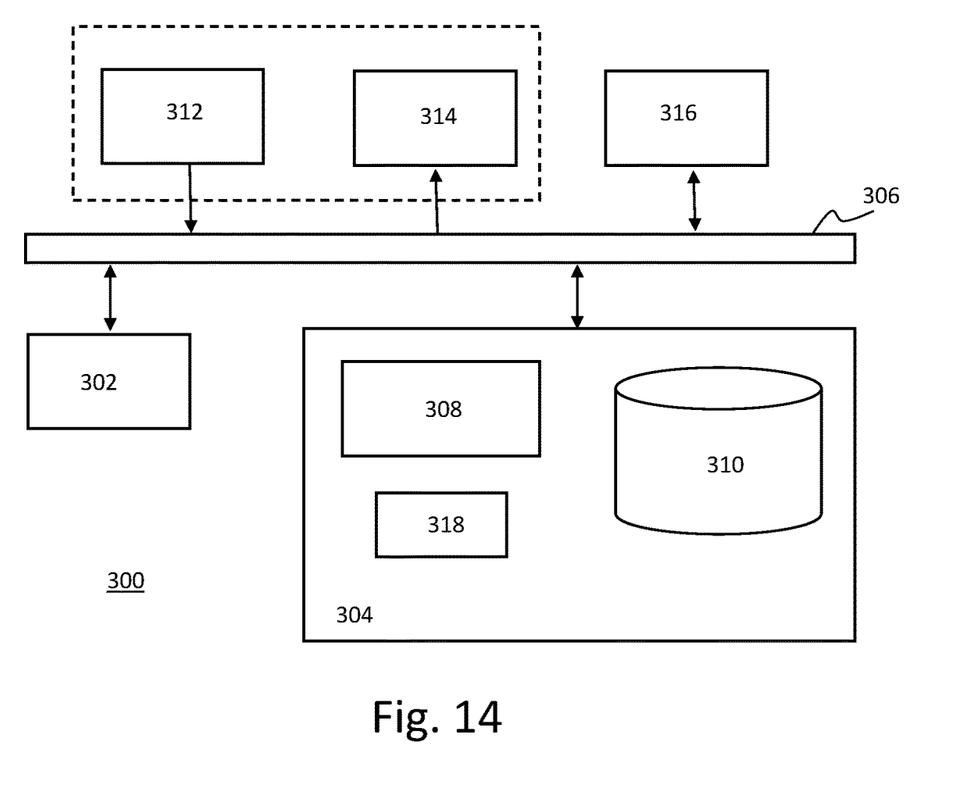
FIG. 14 is a block diagram of an exemplary data processing system for performing the method of the invention.

FIG. 14 depicts a block diagram illustrating an exemplary data processing system that may perform the method as described with reference to FIGS. 3, 4, 6, 9, 11, 12, and 13.

As shown in FIG. 14, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 14 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 14, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 14) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a lighting device to render light effects while an audio rendering device plays a song, said system comprising:
    at least one receiver;
    at least one transmitter; and
    at least one processor configured to:
        obtain an identifier of said song,
        obtain, via said at least one receiver, a music video of said song based on said identifier of said song,
        determine audio segments in said song and corresponding video segments in said music video, such that said audio and video segments reflect a same audio in said song and said music video,
        obtain first audio characteristics of said song,
        obtain second audio characteristics of said music video,
        determine, based on said first audio characteristics and said second audio characteristics, a first point in said song and a second point in said music video which reflect a same moment in said audio and video segments,
        determine a starting point of each of said audio segments in said song and a corresponding starting point of each of said video segments in said music video based on said first and second points, and
        extract a color palette from said music video for each of said video segments based on said starting points,
        determine said light effects for each respective audio segment of said audio segments by selecting colors from said color palette extracted for said respective video segment, and
        control, via said at least one transmitter, said lighting device to render said lights effects determined for said audio segments while said audio rendering device plays said audio corresponding segments of said song.

2. A system as claimed in claim 1, wherein said at least one processor is configured to randomly select said colors for said respective audio segment from said color palette determined for said respective video segment.

3. A system as claimed in claim 1, wherein said at least one processor is configured to:
obtain audio characteristics of said song, and
determine light intensities for said light effects based on said audio characteristics.

4. A system as claimed in claim 1, wherein said at least one processor is configured to determine said audio segments based on metadata associated with said song.

5. A system as claimed in claim 1, wherein said at least one processor is configured to associate said extracted color palette with said identifier of said song and store said extracted color palette and said association in a memory.

6. A system as claimed in claim 1, wherein said at least one processor is configured to analyze said music video to identify cuts in said music video and determine said audio and video segments based on said identified cuts.

7. A system as claimed in claim 1, wherein said at least one processor is configured to extract said color palettes by determining contrasting colors and/or saturated colors from said music video for each of said video segments.

8. A system as claimed in claim 1, wherein said at least one processor is configured to select a video segment from said video segments and extract said color palette from said selected video segment by determining colors per video frame of said selected video segment, combining said colors, and selecting a subset of said combination of said colors.

9. A system as claimed in claim 1, wherein said at least one processor is configured to select a video segment from said video segments and extract said color palette from said selected video segment by determining color changes between same spatial areas of different video frames of said video segments, selecting a subset of said spatial areas above a color change threshold, determining for each respective color of a plurality of colors for said subset of said spatial areas, a quantity of pixels with said respective color, and selecting colors used in said subset of spatial areas based on said quantities of pixels.

10. A system as claimed in claim 1, wherein said at least one processor is configured to select a video segment from said video segments and extract said color palette from said selected video segment by determining for each respective color of a plurality of colors, per one or more video frames of said selected video segment, a quantity of pixels with said respective color and selecting colors from said plurality of colors based on said quantities of pixels.

11. A system as claimed in claim 1, wherein said at least one processor is configured to identify at least a first segment and a second segment that have a content similarity which is above a threshold from said determined segments and extract said color palette for said first video segment and said color palette for said second video segment by extracting a color palette from an added video segment which comprises both said first video segment and said second video segment.

12. A system as claimed in claim 1, wherein said at least one processor is configured to identify at least a first segment and a second segment that have a content similarity which is above a threshold from said determined segments and extract said color palette for said first video segment and said color palette for said second video segment from either said first video segment or said second video segment.

13. A method of controlling a lighting device to render light effects while an audio rendering device plays a song, said method comprising:
obtaining an identifier of said song;
obtaining a music video of said song based on said identifier of said song;
determining audio segments in said song and corresponding video segments in said music video;
obtaining first audio characteristics of said song,
obtaining second audio characteristics of said music video,
determining, based on said first audio characteristics and said second audio characteristics, a first point in said song and a second point in said music video which reflect a same moment said audio and video segments,
determining a starting point of each of said audio segments in said song and a corresponding starting point of each of said video segments in said music video based on said first and second points, and
extracting a color palette from said music video for each of said video segments based on said starting points;
determining said light effects for each respective audio segment of said audio segments by selecting colors from said color palette extracted for said respective video segment; and
controlling said lighting device to render said lights effects determined for said audio segments while said audio rendering device plays said corresponding audio segments of said song.

14. A computer program product for a computing device, the computer program product comprising computer program code to perform the method of claim 13 when the computer program product is run on a processing unit of the computing device.

* * * * *